(12) United States Patent
Ip

(10) Patent No.: US 6,934,598 B2
(45) Date of Patent: Aug. 23, 2005

(54) METHOD OF GENERATING PATTERN VIA LASER CUTTING PROCESS ON A CLOTH OR FABRIC

(75) Inventor: Kam Fuk Derek Ip, Hong Kong (CN)

(73) Assignee: Merit Corporation Limited, Hong Kong (HK)

( * ) Notice: Subject to any disclaimer, the term of this patent is extended or adjusted under 35 U.S.C. 154(b) by 0 days.

(21) Appl. No.: 10/468,876
(22) PCT Filed: Feb. 22, 2002
(86) PCT No.: PCT/CN02/00108
§ 371 (c)(1), (2), (4) Date: Jan. 23, 2004
(87) PCT Pub. No.: WO02/066198
PCT Pub. Date: Aug. 29, 2002

(65) Prior Publication Data
US 2004/0117057 A1 Jun. 17, 2004

(30) Foreign Application Priority Data
Feb. 23, 2001 (CN) .................................. 01104171 A

(51) Int. Cl.⁷ .......................... G06F 19/00; B23K 26/00
(52) U.S. Cl. .................... 700/133; 700/134; 219/121.71
(58) Field of Search ................................. 700/131, 132, 700/133, 134, 135; 219/121.71, 121.7, 121.67, 121.68, 121.69; 83/13, 15, 16, 30, 936, 939, 940

(56) References Cited

U.S. PATENT DOCUMENTS

| 4,748,078 A | * | 5/1988 | Doi et al. ................... 442/312 |
| 5,760,369 A | * | 6/1998 | Wenkman .............. 219/121.71 |
| 5,791,215 A | * | 8/1998 | Morrison et al. .............. 83/13 |
| 6,224,707 B1 | * | 5/2001 | Lion .......................... 156/230 |

FOREIGN PATENT DOCUMENTS

CN 97112584.8 * 12/1997 ................. 700/131

* cited by examiner

*Primary Examiner*—Peter Nerbun
(74) *Attorney, Agent, or Firm*—McDonnell Boehnen Hulbert & Berghoff LLP

(57) ABSTRACT

A method of generating pattern via laser cutting process, comprising the step of:

1) Inputting the designed pattern into a computer system;

2) Putting a material beneath a laser beam;

3) Under the control of the computer system, moving the laser beam over the material or moving the material beneath the laser beam in accordance with the pattern input into the computer system so as to cut and generate the pattern with hollow and penetrated shape. On the cloth or fabric material made by this method, the pattern with hollow shape is clear and regular and the fiber threads can't be shed by the laser-sheared edge.

6 Claims, 7 Drawing Sheets

METHOD OF GENERATING PATTERN VIA LASER CUTTING PROCESS ON A CLOTH OR FABRIC

TECHNICAL FIELD

The present invention relates to a method of generating pattern using laser processing and a material made by this method, particularly to a method of generating a pattern via laser cutting process on a cloth or a fabric material and a material made by this method.

BACKGROUND ART

Current leno patterns formed with conventional method on cloth or textile, are generally further processes on the sheared edge of the pattern, e.g. sealing the sheared edge with a fine thread, to prevent the fiber from being irregular and shedding. In a CN patent application No. 97112584.8, i.e. No. CN1168937A published on Dec. 31, 1997, a pattern generating method through laser processing had been disclosed, wherein, the designed pattern was primarily input into a computer system. Then the material was dyed with deep color and put beneath a scanning laser beam of laser scanner. Under the control of the computer system, scanning movement of the laser beam on the material was operated according to the pattern input to the computer. The areas on the material after laser illumination were decolorized, and the contrast against the areas without laser illumination appears in comparison, thereby the designed pattern being directly shown on the material. The limitation is, wherein, said material must be dyed with deep color. While white or light cloth or fabric can only be adapted for the invention via deep color dyeing. Hence, it is impossible to generate a pattern directly under the premise of keeping original light color according to that invention. In other words, the scope of work is practically reduced by that invention. Moreover, the process of dye not only complicates the procedure and increases the cost, but also requires that the energy of laser should be controlled exactly during operation. Otherwise, if the energy is too small, the decolorized effect is insignificant. If the energy is too strong, the cloth shall be carbonized. Thereby it difficult to realize the object of generating pattern according to that invention. Due to the utilization of dye, it is even causes not only complicated procedure and operation but also environmental pollution.

DISCLOSURE OF THE INVENTION

In view of these facts, in order to prevent material from shedding due to irregularity, simplify the procedures and operation, save the cost, enlarge the scope of work of the cloth and reduce environmental pollution to the greatest extent, the inventor created a method of material cutting to generate a hollow pattern employing laser processing on the cloth or fabric.

An object of the invention is to provide a method of generating pattern via laser cutting process so as to overcome the drawbacks of material shedding due to irregularity, relatively complicated procedures and operation, higher cost, narrower scope of work for the cloth and unavoidable environment pollution.

The method of generating a pattern via laser cutting process comprising the following step:

1) Input the designed pattern into a computer system;
2) Put a material beneath a laser beam;
3) Under the control of the computer system, moving the laser beam over the material or moving the material beneath the laser beam in accordance with the pattern input into the computer system so as to cut and generate the pattern with hollow and penetrated shape;
4) The edge of the pattern with hollow shape of the said material is a clear non-shedding laser-sheared edge.

After laser cutting, the sheared edge is extremely regular and the fiber threads can't be exposed and shed. Therefore, the desired clear pattern can be formed one-off without further process for the sheared edge.

In above method of the invention, the said material may be any material having any color, e.g. deep, light, white or natural color, synthetic fiber, or blend fabric blending synthetic fiber with natural fiber. Preferably, said laser emits 50 to 400 $\mu$J of energy with 0.25 to 10,000 Hz of pulse. When the frequency of laser pulse exceeds 10,000 Hz, the released energy should be preferably controlled within the scope of 0.5 to 200 W.

The said method is characterized in that when the thickness of the said material is 0.3–0.5 mm, the laser energy is 75–100 $\mu$J with 2000 Hz of laser pulse.

The said method is characterized in that when the thickness of the said material is 0.5–0.7 mm, the laser energy is 100–150 $\mu$J with 3000 Hz of laser pulse.

The requirement for laser energy depends on the thickness of the material and the reaction of the material to the laser.

The method of generating a pattern via the laser cutting process of the invention, has the advantages of cutting pattern to hollow shape, clear pattern, regular and unshed fabric, simple process and operation, lower cost, broader scope of work to the cloth, no pollution and higher efficiency.

The other object of the invention is to provide a kind of cloth or fabric material, which has clear pattern and regular fabric and that the fiber threads can't be shed by the sheared edge.

To realize the above object, the cloth or fabric material made by the said method in this invention, is characterized in that the pattern of the said material is generated in hollow penetrated shape and the edge of the pattern with hollow shape is a clear non-shedding laser-sheared edge.

The said cloth or fabric material is characterized in that the said material may be synthetic fiber or blend fabric blended synthetic fiber with natural fiber having any color.

The said cloth or fabric material is characterized in that the thickness of the said material is 0.3–0.7 mm.

The said cloth or fabric material is characterized in that the pattern of the said material is a flower pattern.

In order to comprehend further the object, technical features and effect of the invention, the specific content and embodiments of the invention shall be described in detail incorporating with the drawings.

BEST MODE FOR CARRYING OUT THE INVENTION

Figure 1:
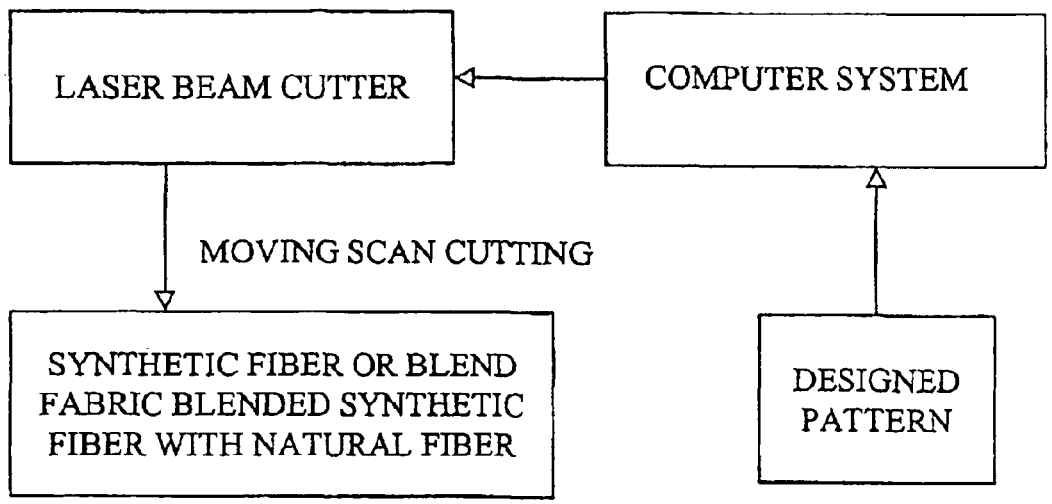
FIG. 1 is a schematic block diagram illustrating the method of generating pattern via laser cutting process according to the invention.

As shown in FIG. 1, in the embodiment 1, the designer inputs the designed pattern to the computer system. Then the white synthetic fiber material having 0.3 mm thickness is put beneath the laser beam. Under the control of the computer system, the laser beam moves over the material in accordance with the pattern input to the computer system, and then an original design pattern is generated on the material via laser cutting.

Figure 2:
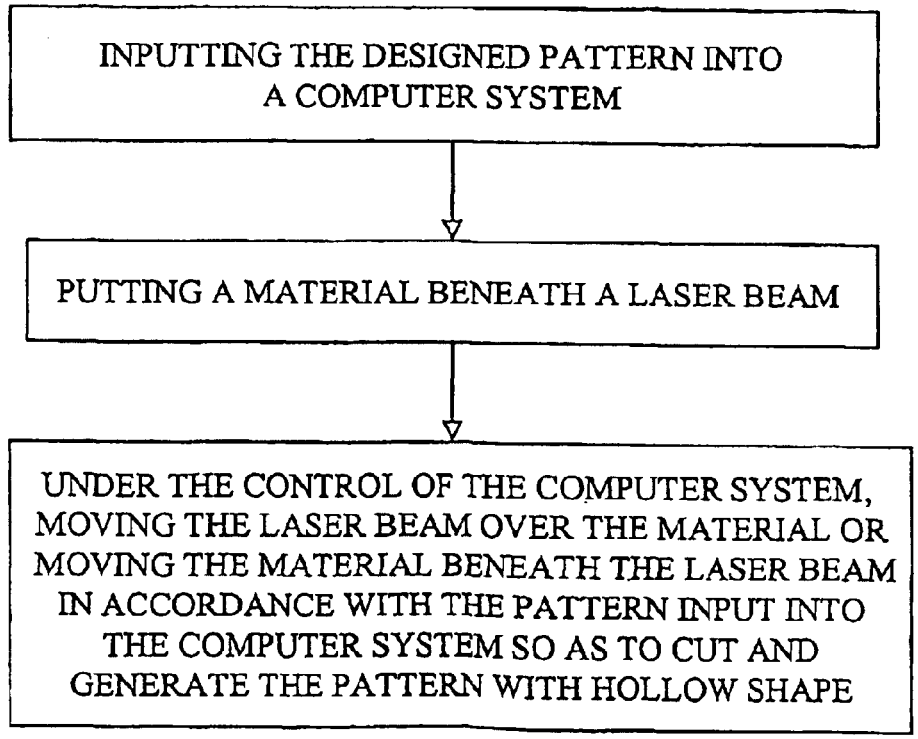
FIG. 2 is a schematic process diagram illustrating the method of generating pattern via laser cutting process according to the invention.
Figure 3:
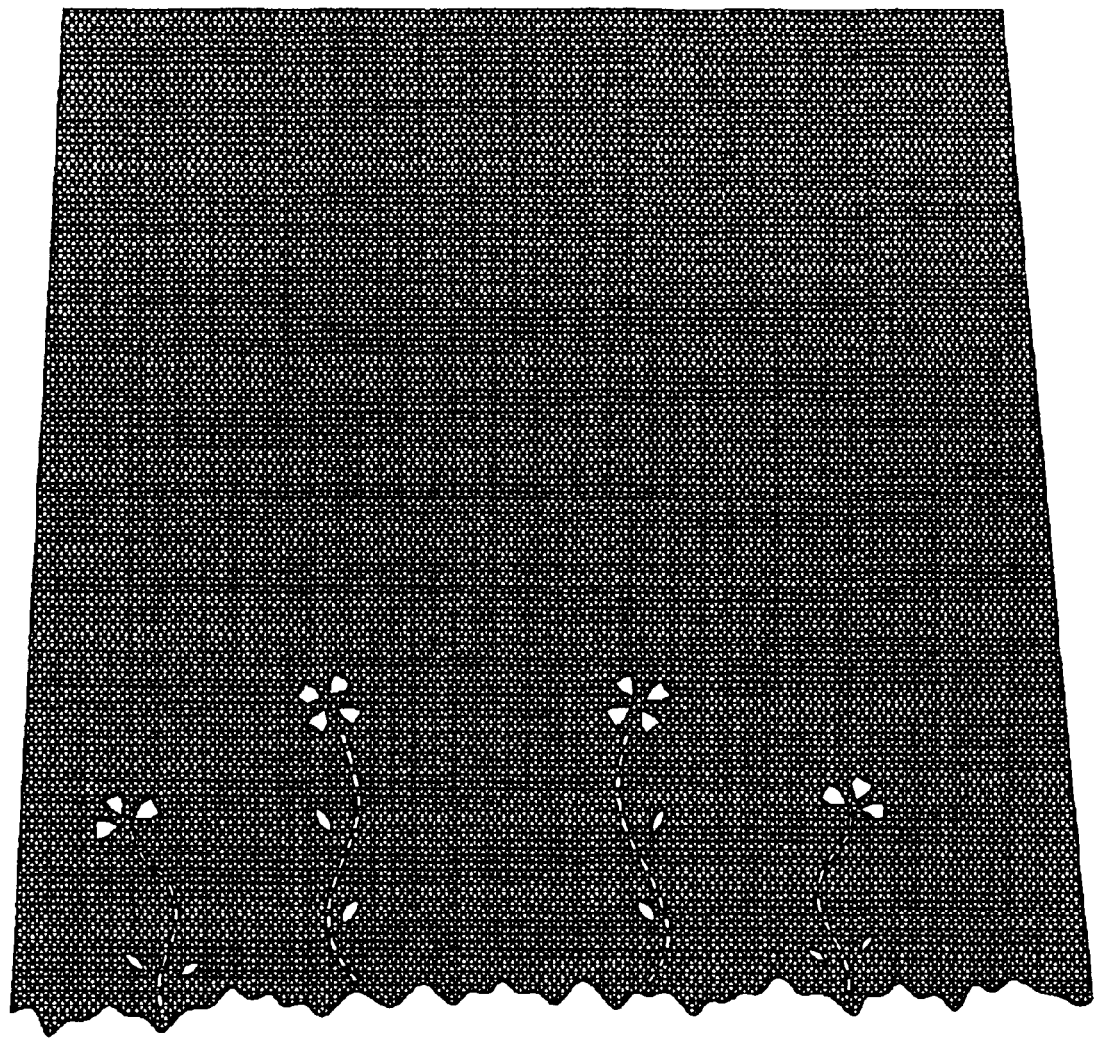
FIG. 3 is a schematic pattern generated with the method of generating pattern via laser cutting process according to the invention.

As shown in FIG. 2, in above embodiment, after laser cutting, an original designed pattern is generated on the 0.3 mm thickness of white synthetic fiber material. The phenomenon of fiber shedding cannot appear on the scanned areas. And then a hollow flower pattern as shown in FIG. 3 is generated due to the contrast to the areas without scanning. In the embodiment, the emitted energy is 80 μJ with 2000 Hz of laser pulse.

Figure 4:
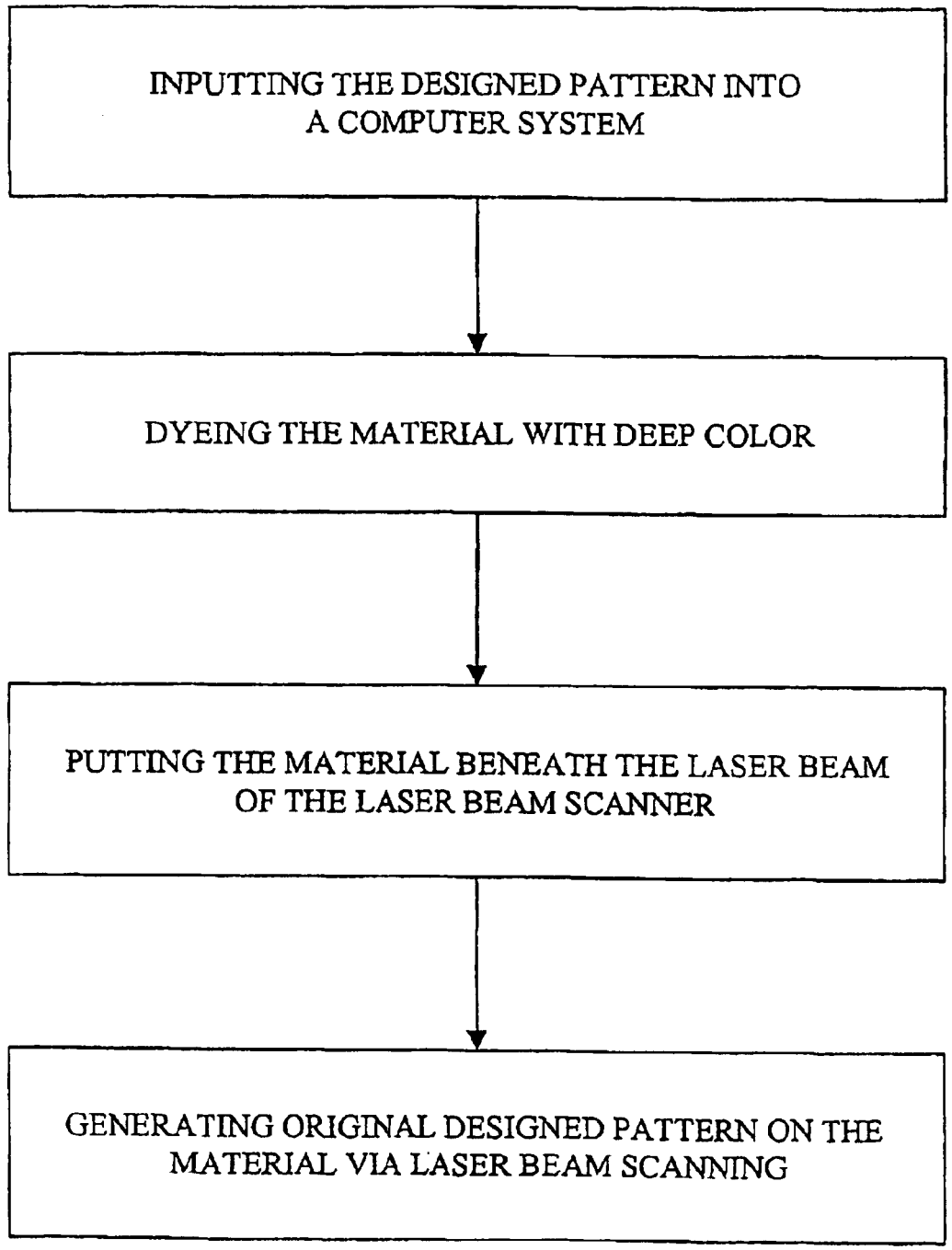
FIG. 4 is a schematic process diagram illustrating the method of generating pattern via laser process according to the prior art (CN application No.97112584.8).
Figure 5:
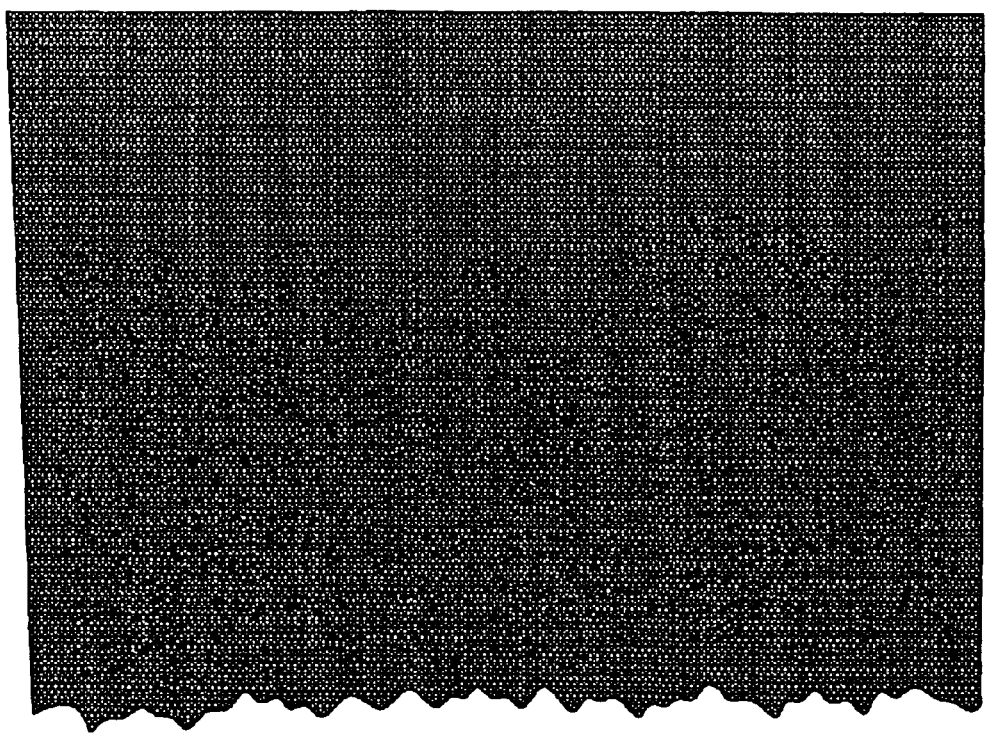
FIG. 5 is a schematic pattern generated with the method of generating pattern via laser process according to the prior art of FIG. 4.

Referring to FIG. 4, a referenced embodiment is shown. The designer inputs the designed pattern into a computer system. Then the 0.5 mm thickness of white synthetic fiber material is dyed with deep blue and put beneath the laser beam of laser scanner. Under the control of the computer system, a pattern as shown in FIG. 5 is pictured on the material via laser scanning according to the input design pattern. In the referenced embodiment, the emitted energy is 100 μJ with 2500 Hz of laser pulse.

If the thickness of the material varies, the utilized laser energy should also be changed. If different material has a different reaction to a laser, the utilized laser energy should also be adjusted.

According to said method of the embodiment 1, the tests of embodiment 2–4 are performed under the different condition of material type, color, thickness and laser energy as described in table 1.

| | Type | Color | Thickness | Laser energy/Pulse (μJ/Hz) |
|---|---|---|---|---|
| Embodiment 2 | Synthetic fiber cloth A | Deep | 0.3 | 75/2,000 |
| Embodiment 3 | Blend fabric cloth B blending synthetic fiber with natural fiber | Deep | 0.5 | 100/2,000 |
| Embodiment 4 | Blend fabric cloth C blending synthetic fiber with natural fiber | Light | 0.7 | 150/3,000 |

Figure 6:
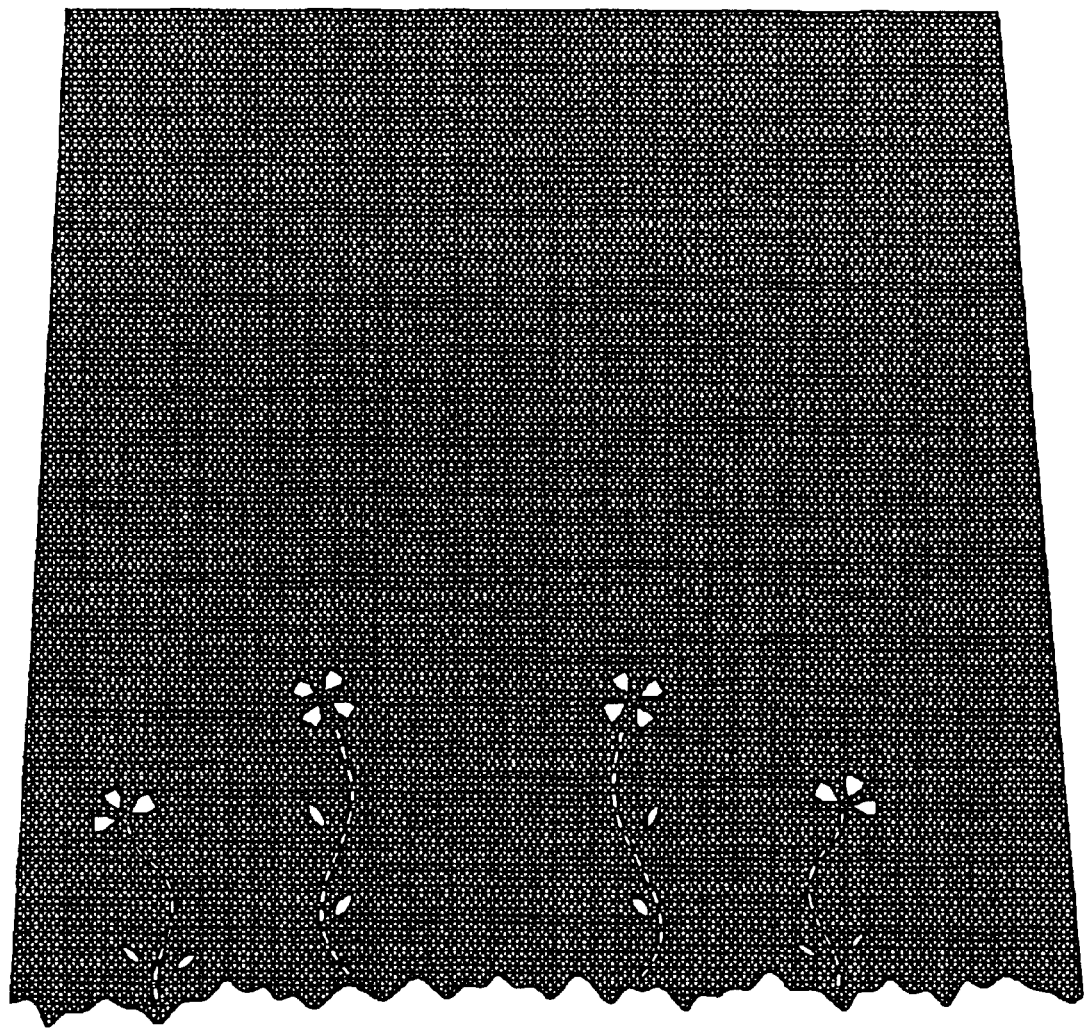
FIG. 6 is a schematic pattern of embodiment 2 according to the invention.
Figure 7:
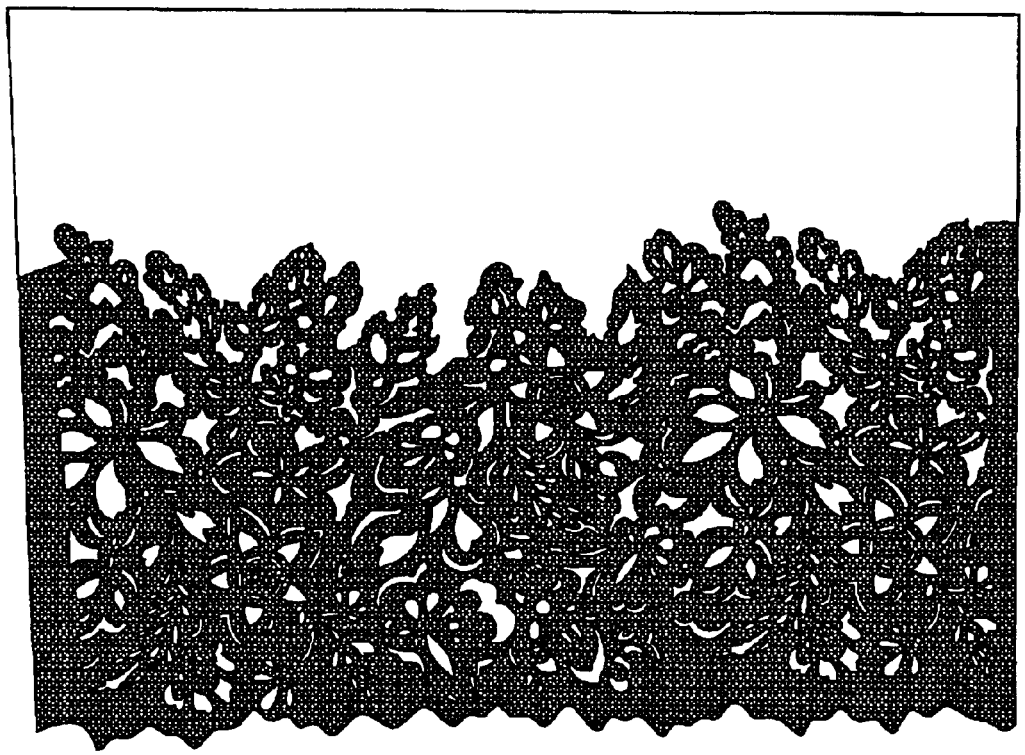
FIG. 7 is a schematic pattern of embodiment 3 according to the invention.
Figure 8:
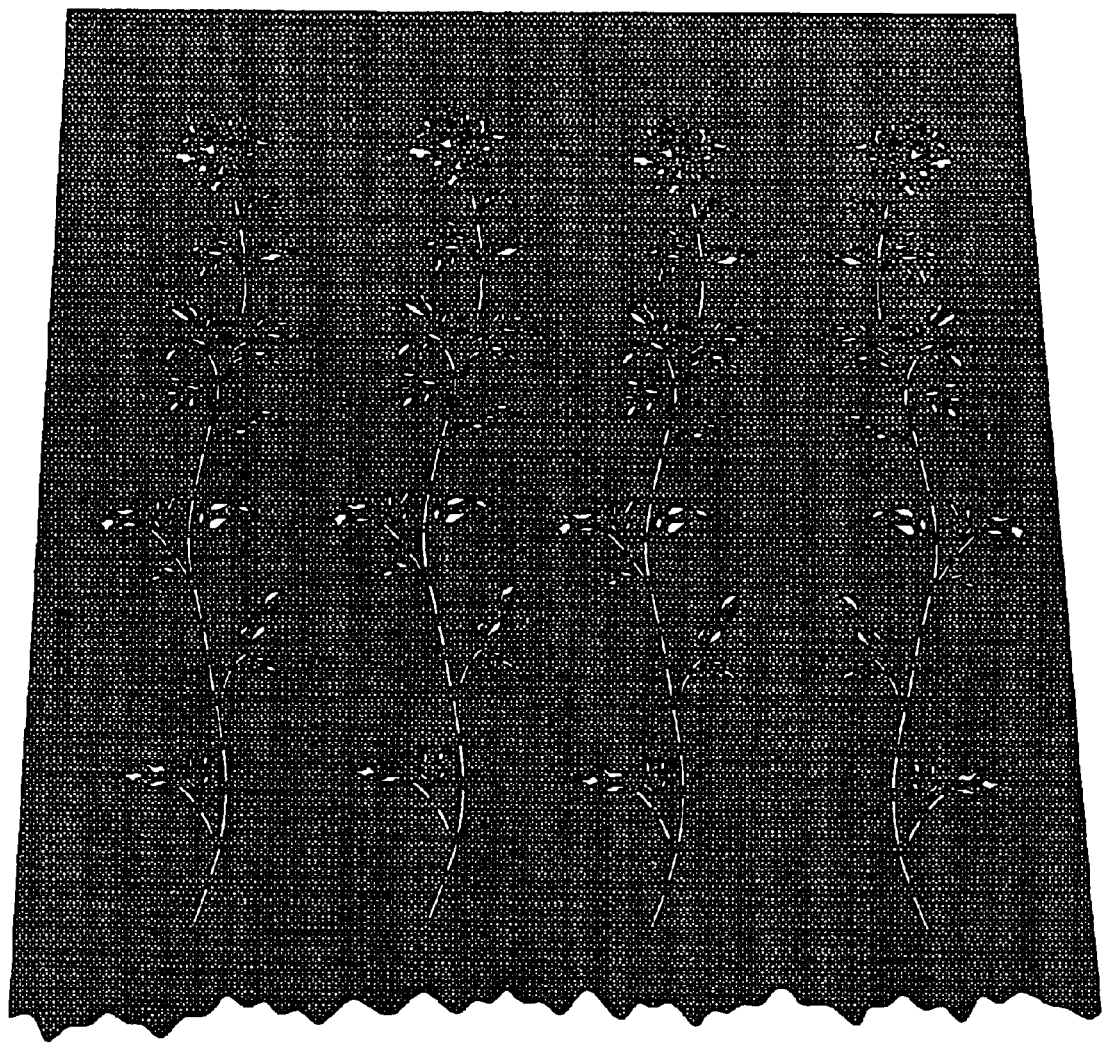
FIG. 8 is a schematic pattern of embodiment 4 according to the invention.

Carrying out the tests according to the conditions indicated in table 1, the patterns as shown in FIG. 6–8 can be acquired. Viewing from the results of embodiments 1, 2, 3 and 4 of the invention, whatever material is selected from synthetic fiber cloth, blend fabric cloth blending synthetic fiber with natural fiber, deep, light or white cloth, the patterns can be generated with some features of cutting pattern to hollow shape, clear pattern, regular and unshed fabric, unexposed thrum, simple process and operation, lower cost, broader scope of work to the cloth, no pollution and higher efficiency.

From the results of the referenced embodiment, however, it can be seen that the pattern as shown in FIG. 5 generated through inputting the designed pattern into the computer system and dyeing the white synthetic fiber cloth with deep blue and putting the cloth beneath the laser beam and scanning the cloth in accordance with the input pattern is pictured on the cloth directly with non-hollow shape.

Consequently, from FIG. 5 and FIG. 7, it can be seen that the most distinct difference of the patterns between the invention and the referenced embodiment is that the pattern of the invention presents a hollow shape, and the pattern is clearer and better integral feeling, having a stronger artistry, just like a paper-cut.

INDUSTRIAL APPLICABILITY

To sum up, the method of generating a pattern via the laser cutting process of the invention is an innovative method for cutting material to generate pattern of hollow shape. The design pattern is input into the computer system and the movement of the laser beam or material through computer system and scanning and cutting the material is controlled in accordance with the input pattern, the pattern with hollow shape shall be presented along the cut track on the material. The above method has the advantages of clear and regular shaping, unexposed thrum, simple process and operation, lower cost, no pollution and higher efficiency.

What is claimed is:

1. A method of generating a pattern via a laser cutting process, comprising the step of:

1) inputting a designed pattern into a computer system;
   2) putting a material beneath a laser beam;
   3) under the control of the computer system, moving the laser beam over the material or moving the material beneath the laser beam in accordance with the pattern input into the computer system so as to cut and generate the pattern with hollow shape; wherein the edge of the generated pattern with hollow and penetrated shape of the material is a clear non-shedding laser-sheared edge; said laser emitting 50–400 μJ of energy with 0.25–10,000 Hz of pulse, or 0.5–200 W of power with more than 10,000 Hz of pulse.

2. The method according to claim 1, wherein the said material is cloth or fabric with any color.

3. The method according to claim 2, wherein the said cloth is selected from synthetic fiber or blend blending synthetic fiber with natural fiber.

4. The method according to claim 2, wherein the said fabric is selected from synthetic fiber or blend blending synthetic fiber with natural fiber.

5. The method according to claim 2 wherein the thickness of the cloth or fabric is from 0.3 to 0.5 mm and wherein the laser energy is from 75–100 μJ with about a 2000 Hz laser pulse.

6. The method according to claim 1 wherein the thickness of said cloth or fabric is 0.5–0.7 mm and wherein the laser energy is 100–150 μJ with about a 3000 Hz laser pulse.

* * * * *